Dec. 1, 1964    C. P. SALMON    3,159,033
MECHANICAL MOTION TRANSMITTER
Filed March 24, 1959

INVENTOR.
Clarence P. Salmon
BY
Olson & Trexler
attys.

3,159,033
MECHANICAL MOTION TRANSMITTER
Clarence P. Salmon, Elgin, Ill., assignor to Flexonics Corporation, Maywood, Ill., a corporation of Illinois
Filed Mar. 24, 1959, Ser. No. 801,534
1 Claim. (Cl. 73—368.3)

This invention relates generally to a mechanical motion transmitter and more particularly to a device that may be arranged to transmit mechanical motions in response to temperature changes.

Devices of the type described have heretofore exhibited a response characteristic for decreasing temperatures that is substantially different from the response characteristic for increasing temperatures. In plotting mechanical movement against temperature, for example, there result curves similar in nature to the well known hysteresis loop.

This inherent, appreciable energy irreversibility of prior art devices has tended to frustrate the accuracy of the control available through their use. Control must be selected to follow the curve of increasing temperature, the curve of decreasing temperature, or some curve therebetween; and under any of these selected circumstances, occasions will arise wherein the actual situation and the signaled situation vary considerably.

It is therefore an important object of the present invention to provide a mechanical motion transmitter which displays a reduced hysteresis motion lag on temperature trend reversal.

Another object of the invention is to provide a mechanical motion transmitter having a more nearly linear response characteristic.

Yet another object of the invention is to provide a mechanical motion transmitter in which the flexible member is not subjected to rupturing forces and which, therefore, displays longer life.

A further object of the invention is to provide an improved control device which is simple in construction and economical to manufacture.

A still further object of the invention is to provide an improved thermostat which displays a large movement for each unit change in temperature.

Additional objects and features of the invention pertain to the particular structure and arrangements whereby the above objects are attained.

The structure in accordance with the invention includes a rigid bush adapted to close off the open end of a cup-like housing, a resilient element interposed between the bush and the cup-like housing to extend partially into a cavity in the housing, a piston slidably received into the bush to engage a recess in the resilient element, and a quantity of expansible liquid confined in the cavity of the housing.

The invention, both to its structure and mode of operation, will be better understood by reference to the following disclosure and drawings forming a part thereof, wherein.

Figure 1:
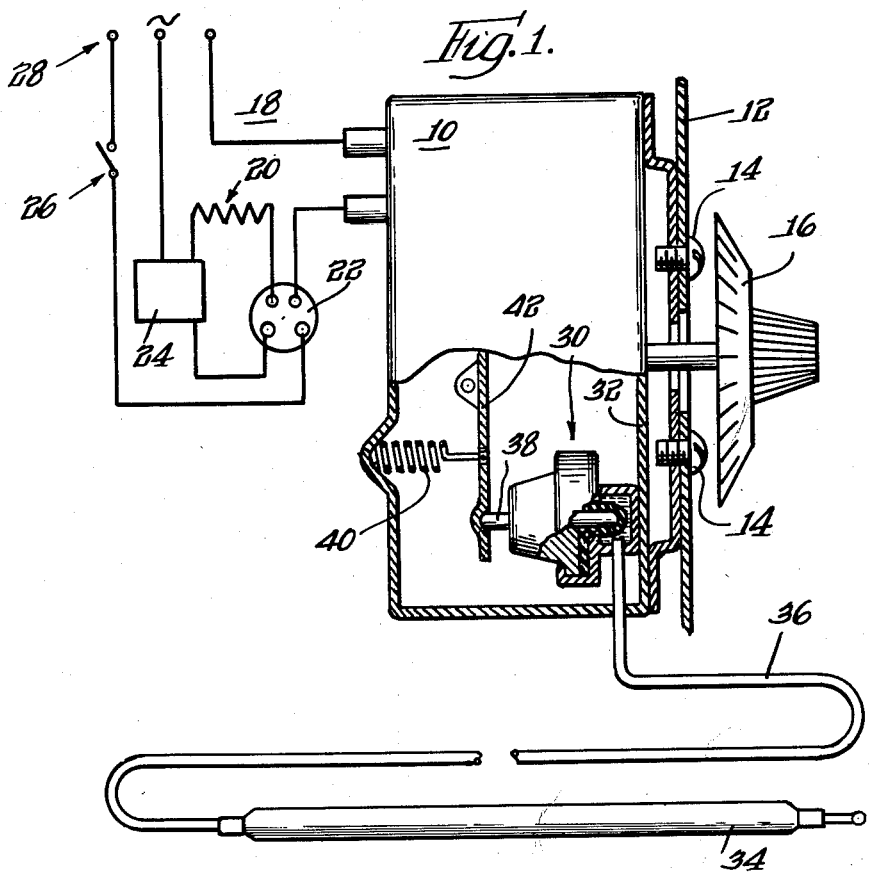
FIG. 1 is a partially cut away schematic side view of a control unit for a domestic clothes dryer incorporating a mechanical motion transmitter in accordance with the present invention.

Referring now in detail to the drawings, specifically to FIG. 1, there will be seen a control unit for a domestic clothes dryer including a temperature controller 10 which is mounted inside the front panel 12 of the clothes dryer as by screws 14. A manual adjusting dial 16 extends through the panel 12 to communicate with and regulate the controller 10.

The controller 10 is embodied in a control circuit indicated generally at 18 and is connected, as shown, to operate a heating element 20. Circuit 18 also includes a blower motor 22, a timer 24, a manual switch 26 and a suitable power source 28, conventionally a source of single phase, three wire, 220 volt electric power.

It is recognized that the controller 10 may be equally as well arranged to operate a gas-fired clothes dryer.

The controller 10 includes a mechanical motion transmitter 30 which is securely fastened to the wall 32 and which communicates with the drying cabinet proper by means of the sensing bulb 34 and the capillary tube 36. Transmitter 30 is adapted to urge a piston 38 against the loading of a spring 40, thereby operating a lever 42 to open and close appropriate switching means included in the controller 10.

It will become apparent that, as the temperature within the drying cabinet proper rises under the influence of heating element 20, the thermally expansible liquid contained within bulb 34 will expand. As will be brought out more clearly hereinbelow, this expansion effects an outward extension of piston 38. As the extension of piston 38 continues, there will eventually be reached the point at which control has been selected to occur by means of the dial 16. When this control temperature has been reached, lever 42, under the direction piston 38, will result in deenergization of heating element 20, as by opening appropriate contacts connected in series with timer 24 and element 20.

Conversely, when the temperature within the drying cabinet proper falls below the desired operating temperature, this condition will be sensed by means of the bulb 34; and piston 38 will no longer urge lever 42 to open the contacts connected in series with element 20, permitting these to close. Under such conditions and with motor 22 and timer 24 operated, heating element 20 will once again be energized.

Figure 2:
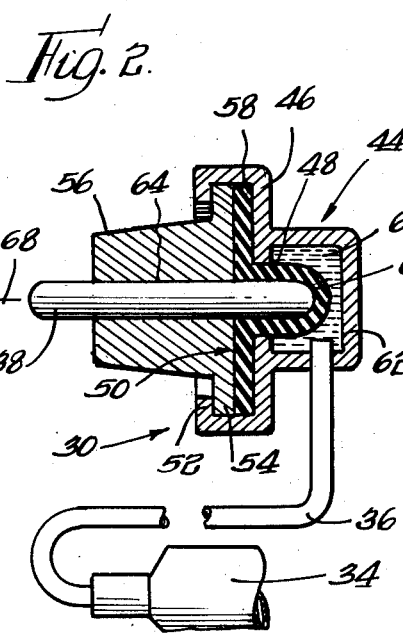
FIG. 2 is an enlarged side view in section of the mechanical motion transmitter shown in FIG. 1.

Turning now to FIG. 2 for a more detailed description of the transmitter 30, there will be seen a rigid, cup-like housing 44 having a shoulder portion 46 which is centrally apertured to receive the sleeve portion 48 of an element 50. The shoulder portion 46 terminates in a lip portion 52 which is arranged to be formed or crimped over the flange 54 of bush 56.

Element 50 is preferably fabricated from natural or synthetic rubber or any other similar, resiliently deformable material. Additionally, element 50 includes a gasket portion 58 which acts as a seal between the flange 54 and the shoulder portion 46.

Sleeve 48 includes a recess 60 and depends into the cavity 62 of housing 44. Recess 60 is arranged to receive snugly the piston 38 which extends slidably through the cylindrical bore 64 in bush 56. Appropriately, cavity 62 is filled with a quantity of an expansible liquid 66. Therefore, since the sleeve 48 extends into the cavity 60 and contacts the liquid 66, it is desirable to select the material for element 50 to be one which is not deleteriously affected by chemical interaction with the expansible liquid 66.

In order to obviate the need for mechanical linkages multiplying the motions of piston 38, the volume of the piston 38 which extends into recess 60 is selected to be a fraction of the volume of liquid 66. Being thus devised, specific embodiments of the motion transmitter of the present invention have provided as much as four times the movement per degree temperature change that has been heretofore obtainable.

An important feature of the invention resides in the described arrangement of the element 50. By so arranging element 50, pressure developed by the expansible liquid 66 tends, on piston movement, to thicken the sections of the element 50. Thus, the various portions are placed under compression rather than tension eliminating those stresses tending to rupture the resilient element. Moreover, forces are distributed equally throughout the element 50, precluding the possibility of developing excessive strain at any one point.

According to another important feature of the invention, the bush 56 is of a rigid, non-deforming nature, preferably being fashioned from a free machining leaded brass having good bearing properties. Thus, the piston 38 is easily maintained in accurate axial alignment, insuring the intended cooperation between piston 38 and sleeve 48.

In order to promote a linear response characteristic, the expansible liquid 66 is preferably selected from the low viscosity, silicone and mineral oils since these materials do not undergo a phase change over the temperature ranges ordinarily encountered in the use of the mechanical motion transmitter 30. It is recognized, of course, that other thermally stable fluids may be equally well utilized.

Operation of the mechanical motion transmitter 30 may be exemplified as follows. When the temperature of the air or other medium surrounding bulb 34 rises, the liquid 66 contained therein responds by expanding. This expansion is constrained by the housing 44 and the bush 56, thereby being realized almost exclusively by the element 50 which deforms extruding the piston 38 in the direction of the arrow 68.

Oppositely, when the temperature of the medium surrounding the bulb 34 decreases, the liquid 66 will shrink and the piston 38 will be withdrawn into the recess 60 by the latter resuming its former shape and by the urging of an external spring loading, such as may be provided by the spring 40 described hereinabove.

Figure 3:
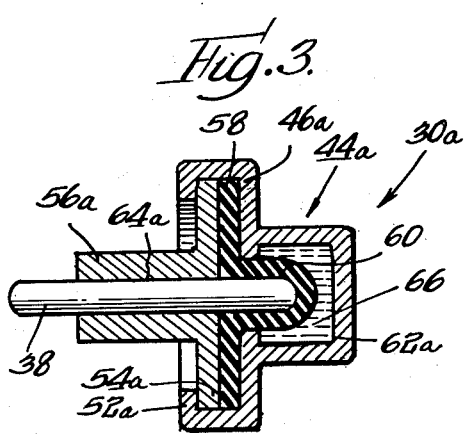
FIG. 3 is a side view in section of another embodiment of the mechanical motion transmitter of the invention.

Since the transmitter of the present invention need not be limited to remote control applications, there is shown in FIG. 3 a transmitter 30a which is arranged with the expansible liquid 66 completely confined within the cavity 62a of a housing 44a. Under such conditions, the liquid 66 responds to the temperature changes to which the housing 44a is exposed. Accordingly, housing 44a may be fabricated from a material which easily conducts heat, as for example, copper.

As is also shown in FIG. 3, a bush 56a of generally T-shaped cross section may be employed to advantage.

The specific examples herein shown and described are illustrative only. Various changes in structure will, no doubt, occur to those skilled in the art; and these changes are to be understood as forming a part of this invention insofar as they fall within the spirit and scope of the appended claim.

The invention is claimed as follows:

A mechanical motion transmitter comprising: a bush having a mounting flange extending an appreciable lateral distance from the bottom surface thereof in coplanar relationship therewith, said bush having a central bore concentric with said flange; a cup-like housing having a shoulder-defining flange extending laterally outwardly from the edges of the open end thereof coextensive with said mounting flange, said housing having a central aperture in said open end through said shoulder-defining flange and aligned with said bore, said housing defining a cavity communicating with said aperture and comprising at least a portion of a closed system, said housing having a formed lip portion extending over the edges of said mounting flange in gripping engagement therewith; a resiliently deformable, elastomeric element having a gasket portion radially coextensive with and compressed between said mounting flange and said shoulder-defining flange and further having a central sleeve portion depending through said aperture into said cavity and defining a recess aligned with said bore and closed off to said cavity; a piston of lesser transverse area than said cavity slidably journaled in said bore and received in said recess; and expansible liquid in said closed system, said shoulder-defining flange extending radially inwardly from the edges of said open end whereby to restrict contact between said fluid and said elastomeric element to the sleeve portion thereof and whereby to define a ring-like guide opening for said sleeve portion.

References Cited in the file of this patent
UNITED STATES PATENTS

| | | |
|---|---|---|
| 2,694,415 | Dillon | Nov. 16, 1954 |
| 2,738,397 | Slonneger | Mar. 13, 1956 |
| 2,781,784 | Baker | Feb. 19, 1957 |
| 2,821,605 | Baker | Jan. 28, 1958 |
| 2,892,063 | Lang | June 23, 1959 |

FOREIGN PATENTS

| | | |
|---|---|---|
| 531,280 | Great Britain | Jan. 1, 1941 |
| 663,907 | Great Britain | Dec. 27, 1951 |